(12) United States Patent
Cherdron et al.

(10) Patent No.: US 7,765,255 B2
(45) Date of Patent: Jul. 27, 2010

(54) EXTENDED WEB INFRASTRUCTURE FOR BUSINESS APPLICATIONS

(75) Inventors: Markus Cherdron, Muelhausen (DE); Kiran Gangadharappa, Sunnyvale, CA (US)

(73) Assignee: SAP AG, Walldorf (DE)

( * ) Notice: Subject to any disclaimer, the term of this patent is extended or adjusted under 35 U.S.C. 154(b) by 2134 days.

(21) Appl. No.: 10/208,210

(22) Filed: Jul. 30, 2002

(65) Prior Publication Data

US 2004/0030758 A1 Feb. 12, 2004

(51) Int. Cl.
G06F 15/16 (2006.01)
G06F 7/00 (2006.01)

(52) U.S. Cl. ........................ 709/203; 707/102
(58) Field of Classification Search ............... 709/203; 707/102

See application file for complete search history.

(56) References Cited

U.S. PATENT DOCUMENTS

| | | | | |
|---|---|---|---|---|
| 5,754,774 A * | 5/1998 | Bittinger et al. | ............ | 709/203 |
| 5,922,044 A * | 7/1999 | Banthia | ............ | 709/203 |
| 5,946,697 A * | 8/1999 | Shen | ............ | 715/205 |
| 5,978,842 A * | 11/1999 | Noble et al. | ............ | 709/218 |
| 5,983,227 A * | 11/1999 | Nazem et al. | ............ | 707/10 |
| 5,999,947 A * | 12/1999 | Zollinger et al. | ............ | 707/203 |
| 6,003,087 A | 12/1999 | Housel, III et al. | | |
| 6,064,979 A * | 5/2000 | Perkowski | ............ | 705/26 |
| 6,199,082 B1 * | 3/2001 | Ferrel et al. | ............ | 715/205 |
| 6,289,347 B1 * | 9/2001 | Giroux | ............ | 707/10 |
| 6,560,639 B1 * | 5/2003 | Dan et al. | ............ | 709/218 |
| 6,628,767 B1 * | 9/2003 | Wellner et al. | ............ | 379/202.01 |
| 6,996,565 B2 * | 2/2006 | Skufca et al. | ............ | 707/10 |
| 7,051,084 B1 * | 5/2006 | Hayton et al. | ............ | 709/219 |
| 7,174,342 B1 * | 2/2007 | Scheurich et al. | ............ | 707/102 |
| 7,225,252 B2 * | 5/2007 | Safa et al. | ............ | 709/224 |
| 7,225,257 B2 * | 5/2007 | Aoike et al. | ............ | 709/225 |
| 2002/0107892 A1 * | 8/2002 | Chittu et al. | ............ | 707/514 |
| 2002/0184632 A1 * | 12/2002 | Reitmeier | ............ | 725/47 |
| 2003/0093400 A1 * | 5/2003 | Santosuosso | ............ | 707/1 |

FOREIGN PATENT DOCUMENTS

| EP | 1016987 | 7/2000 |
|---|---|---|
| WO | WO 01/57718 A2 | 8/2001 |

OTHER PUBLICATIONS

William, S., "HTTP: Delta-Encoding Notes", Internet, Jan. 17, 1997.
Communication from European Patent Office dated May 8, 2009, in corresponding application EP 01 129 096.2-2201 (6 pages).

* cited by examiner

*Primary Examiner*—Larry Donaghue
*Assistant Examiner*—Asghar Bilgrami
(74) *Attorney, Agent, or Firm*—Finnegan, Henderson, Farabow, Garrett & Dunner, LLP (57) ABSTRACT

A method and system for refreshing client-data is provided. A client provides a predefined layout document and predetermined client-data stored in a client-data cache. The layout document uses the client-data via predefined client-side application independent functions. The client receives a sync-request to synchronize the client-data with corresponding server-data of a server. The client creates a client-data descriptor. The server generates a server-data descriptor that is dependent on the client-data descriptor, a server-side copy of predefined client-data and the server-data. The client updates the predetermined client-data in the client-data cache according to the server-data descriptor. The client-data, the client-data descriptor and the server-data descriptor have a browser independent format.

22 Claims, 8 Drawing Sheets

EXTENDED WEB INFRASTRUCTURE FOR BUSINESS APPLICATIONS

FIELD OF THE INVENTION

The present invention relates to extended web infrastructure for business applications.

BACKGROUND

Client/server describes a relationship between two computer programs in which one program, a client, makes a service request from another program, a server, which fulfills the request. Although the client/server idea can be used by programs within a single computer, it is a more important idea in a network. In a network, the client/server model provides a convenient way to interconnect programs that are distributed efficiently across different locations. Computer transactions using a client/server model are common. For example, to check a bank account from a computer, a client program in the computer forwards the request to a server program at the bank. That program may in turn forward the request to its own client program that sends a request to a database server at another bank computer to retrieve an account balance. The balance is returned back to the bank data client, which in turn serves it back to the client in the personal computer, which displays the information to the user.

In an example client/server model, one server, sometimes called a daemon, is activated and awaits client requests. Typically, multiple client programs share the services of a common server program. Both client programs and server programs are often part of a larger program or application. Relative to the Internet, a Web browser is a client program that requests services (the sending of Web pages or files) from a Web server (which is generally referred to as a Hypertext Transport Protocol or HTTP server) in another computer somewhere on the Internet. Similarly, computer with TCP/IP installed allows a user to make a client request for files from the File Transfer Protocol (FTP) servers in other computers on the Internet.

SUMMARY

In an aspect, the invention features a method for refreshing client-data that are visualized by a browser running on a client, including providing at the client a predefined layout document and predetermined client-data, the predetermined client-data stored in a client-data cache in a browser independent format, the layout document using the predetermined client-data via a plurality of predefined client-side application independent functions, receiving at the client a sync-request to synchronize the predetermined client-data with corresponding server-data of a server, creating on the client a client-data descriptor having a browser independent format, generating on the server a server-data descriptor dependent on the client-data descriptor and a server-side copy of predefined client-data and the server-data, the server-data descriptor having a browser independent format, and updating on the client the predetermined client-data in the client-data cache according to the server-data descriptor.

One or more of the following may be included. Providing may include providing the client storing the layout document in a browser cache. The sync-request may have a request type. The client-data descriptor may include the request type. The client-data descriptor also may include a layout-ID representing the layout document. The client-data descriptor may also include a client-data increment. The client-data descriptor may be an extensible markup language document. The server may store a copy of the predetermined client-data by combining the client-data increment with the copy of the predefined client-data. The server-data descriptor may include an updated layout-ID. The server-data descriptor may include a server-data increment. The server-data increment may include object data and layout data. The server-data descriptor may be an extensible markup language document.

The client may use the server-data increment to update client-data. The server may create a server-side copy that corresponds to updated client-data by using the server-data increment and the copy of the predetermined client-data. The updated client-data may include object data and layout data.

The method may also include comparing at the client the server-data descriptor with the client-data descriptor to select a corresponding layout document, and applying at the client the updated client-data to the corresponding layout document. The corresponding layout document may have a document object model and applying may include an in-memory replacement of the document object model. The client may apply the updated client-data to the corresponding layout document via a JAVA-Script function. The client may apply the updated client-data to the corresponding layout document via a style sheet language transformation.

In another aspect, the invention features a method for refreshing client-data that are visualized by a browser running on a client, including providing at the client a predefined layout document and predetermined client-data, the predetermined client-data being stored in a client-data cache in a browser independent format, the layout document using the client-data via a plurality of predefined client-side application independent functions, receiving at the client a change-request to change the predetermined client-data into updated client-data according to the change request, updating on the client the predetermined client-data in the client-data cache according to the change request, and applying at the client the updated client-data to the layout document.

One or more of the following may be included. The layout document may have a document object model and applying may include an in-memory replacement of the document object model. The client may apply the updated client-data to the layout document via a JAVA-Script function. The client may apply the updated client-data to the layout document via a style sheet language transformation.

In another aspect, the invention features a client-data cache for storing client-data on a client, the client data being used by a layout document and being visualized by a browser running on the client, the client-data cache characterized in that the client-data has a format that is independent of the browser and the client's operating system, and the client-data is stored in the client-data cache are accessed by the layout document via a plurality of predefined client-side application independent functions.

In another aspect, the invention features a client-data cache for storing client-data on a client, the client data being used by a layout document and being visualized by a browser running on the client, the client-data cache characterized in that the client-data is stored in the client-data cache as an extensible markup language (XML) document, and the client-data is stored in the client-cache are accessed by the layout document via a plurality of predefined client-side application independent functions.

In another aspect, the invention features a computer system including at least a client computer having a client-memory and a server computer having a server-memory, the client-memory for storing a layout document and further including a client-data cache for storing client-data, the client data being used by the layout document, the client-memory further including a client program for receiving a sync-request to synchronize the client-data with server-data of the server, the computer system characterized in that the client-data cache stores client-data in a format that is independent of the browser and the client's operating system, the layout document uses the client-data via a plurality of predefined client-side application independent functions, the client program causes the client to create a client-data descriptor in a browser independent format, a server program stored in the server-memory causes the server to generate a server-data descriptor dependent on the client-data descriptor and a copy of the client-data and the server-data, the server-data descriptor having a browser independent format, and the client program causes the client to update the client-data in client-data cache according to the server-data descriptor.

In another aspect, the invention features a client computer in a computer system, the client having a client-memory for storing a layout document and further including a client-data cache for storing client-data, the client data being used by the layout document, the client-memory further including a client program for receiving a sync-request to synchronize the client-data with server-data of a server of the computer system, the client characterized in that the client-data cache stores client-data in a format that is independent of the browser and the client's operating system, the layout document uses the client-data via a plurality of predefined client-side application independent functions, the client program causes the client a) to create a client-data descriptor in a browser independent format, b) to receive a server-data descriptor that is generated by the server and that depends on the client-data descriptor and a copy of the client-data and the server-data, the server-data descriptor having a browser independent format, and c) to update the client-data in client-data cache according to the server-data descriptor.

In another aspect, the invention features a server computer in a computer system, the server assisting a client to refresh client-data with respect to corresponding server-data provided by the server, the client-data being stored in a client-data cache, the server characterized by a server computer program product having a plurality of instructions for causing the server to a) receive from the client a client-data descriptor having a browser independent format, and b) generate a server-data descriptor dependent on the server-data and the client-data descriptor and a server-side copy of the client-data, the server-data descriptor having a browser independent format.

In another aspect, the invention features a data structure for storing a client-data descriptor in a browser independent format including a request type that corresponds to a sync-request received by a client for refreshing client-data with respect to server-data of a server, the client-data being stored in a client-data cache of the client, and a layout-ID representing a layout document used by the client, wherein the layout document uses the client-data.

One or more of the following may be included. The browser independent format may be XML. The client-data descriptor may also include a client-data increment indicating the difference between predefined client-data and predetermined client-data.

In another aspect, the invention features a data structure for storing a server-data descriptor in a browser independent format including a layout-ID representing a layout document used by the client, wherein the layout document uses client-data stored in a client-data cache, and a server-data increment indicating the difference between the client-data and server-data.

One or more of the following may be included. The server-data increment may include object data and layout data. The browser independent format may be XML.

Other features, objects, and advantages of the invention will be apparent from the description and drawings, and from the claims.

DETAILED DESCRIPTION

Client-data 150 in the following figures, collectively stand for client-data at different points in time T0, T1, . . . Tn.

Figure 1:
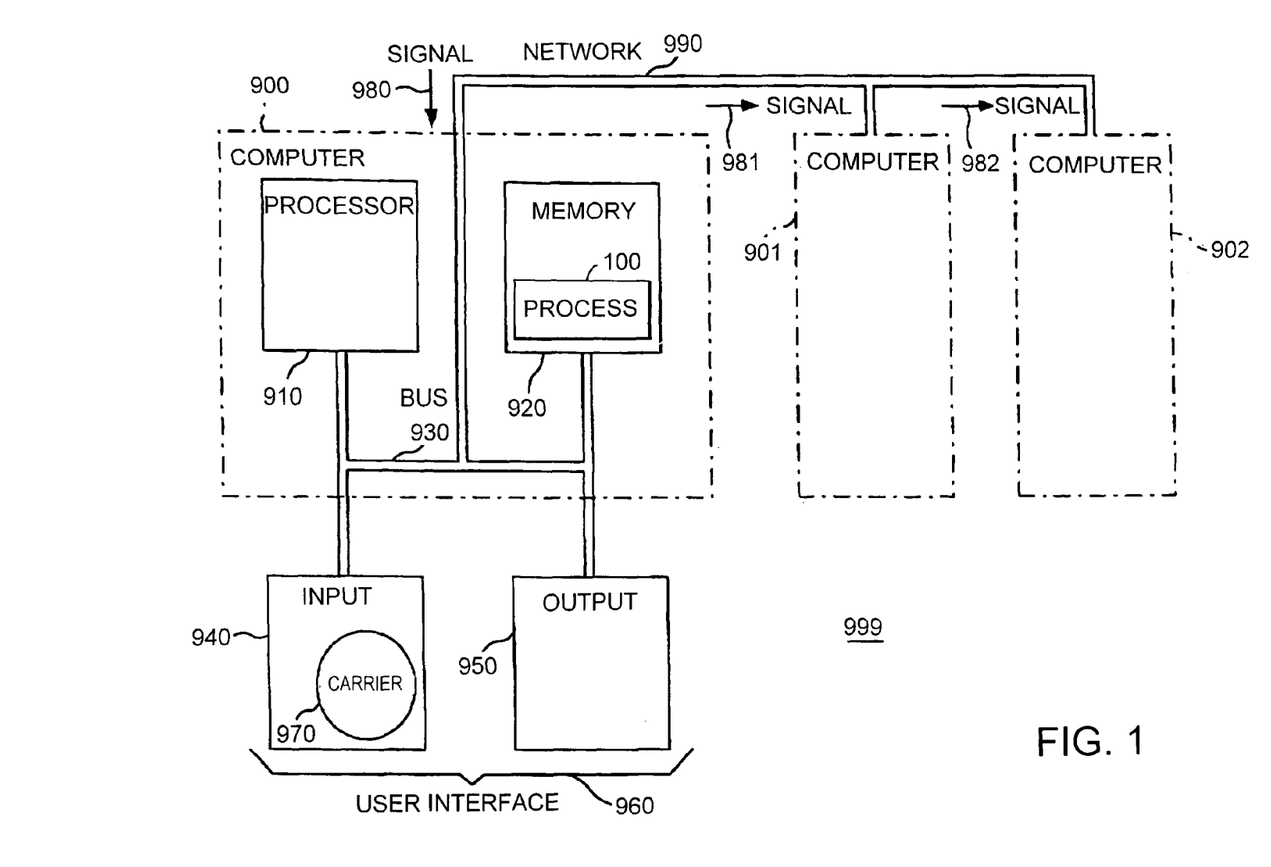
FIG. 1 is a block diagram of a computer system.

Referring to FIG. 1, a network 999 includes a number of computers 900, 901, 902.

Computers 900-902 are coupled via inter-computer network 990. Computer 900 includes a processor 910, a memory 920, a bus 930, and, optionally, an input device 940 and output device 950 (I/O devices, user interface 960). Memory 920 includes a process 100, described below.

In an example, computers 901,902 are referred to as "remote computers". Computer 901,902 is, for example, a server, a router, a peer device or other network node, and typically includes many or all of the elements described relative to computer 900.

Although process 1100 is illustrated as being stored in memory 920, process 1100 may be located elsewhere. For example, process 100 can also be embodied in carrier 970.

Carrier 970 is illustrated outside computer 900. For communicating process 100 to computer 900, carrier 970 is conveniently inserted into input device 940. Carrier 970 is implemented as any computer readable medium. Generally, carrier 970 is an article of manufacture including a non-transitory computer readable medium having computer readable program code embodied therein for executing process 100. Program signal 980 may also embody process 100. Signal 980 travels on network 990 to computer 900.

Input device 940 is a device that provides data and instructions for processing by computer 900. For example, device 940 is a keyboard, a pointing device (e.g., mouse, trackball, cursor direction keys), microphone, joystick, game pad, scanner, and disk drive.

Output device 950 is a device that presents instructions and data that have been processed. For example, a monitor or a display, (cathode ray tube (CRT), flat panel display, liquid crystal display (LCD), speaker, printer, plotter, vibration alert device.

Input device 940 and output device 950 may be combined to a single device.

Bus 930 and network 990 provide logical and physical connections by conveying instruction and data signals. While connections inside computer 900 are conveniently referred to as "bus 930", connections between computers 900-902 are referred to as "network 990". Optionally, network 990 includes gateways being computers that specialize in data transmission and protocol conversion.

Devices 940 and 950 are coupled to computer 900 by bus 930 or by network 990.

Transmission protocols and data formats include, for example, transmission control protocol/internet protocol (TCP/IP), hyper text transfer protocol (HTTP), secure HTTP, wireless application protocol, unique resource locator (URL), a unique resource identifier (URL), hyper text markup language HTML, extensible markup language (XML), extensible hyper text markup language (XHTML), wireless application markup language (WML), and Standard Generalized Markup Language (SGML).

Figure 2:
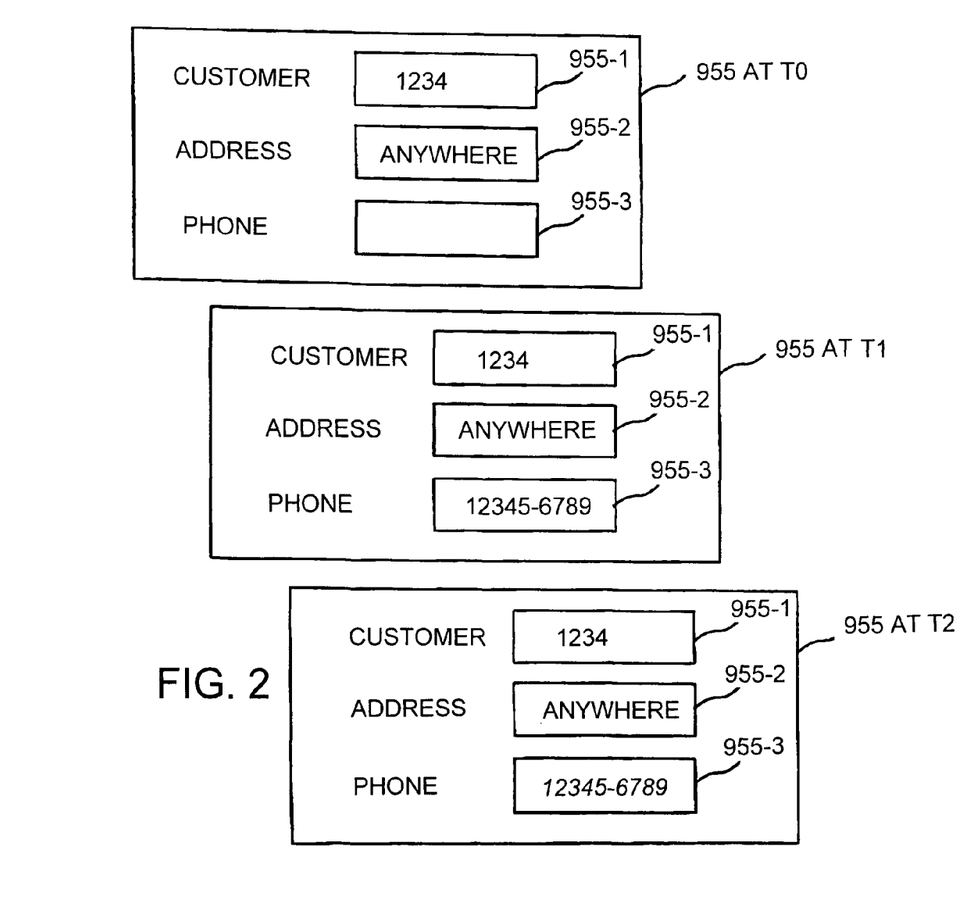
FIG. 2 is a block diagram of an interface document at three consecutive points in time.

Referring to FIG. 2, three consecutive time points T0, T1, T2 of graphical human interface 955 that correspond to a visualization of an interface document is shown. Graphical human interface 955 includes layout elements, such as data entry fields 955-1 to 955-3. Visual attributes, such as position or color of a layout element are determined by a layout document.

In an example, a user (not shown) interacts with client 900 via user interface 960. Client 900 visualizes graphical human interface 955. Graphical human interface 955 prompts the user with layout elements that correspond to application data entry fields 955-1 to 955-3. The layout elements are arranged in a predefined order. In this example, field 955-1 corresponds to a customer number, field 955-2 to a customer address and 955-3 to a customer phone number.

At T0, customer field 955-1 has predefined value "1234" and address field 955-2 has predefined value "ANYWHERE". For example, an application server (e.g. server 901) provides these values (application data) to client 900. Phone number field 955-3 has no predefined value.

At T1, the user enters the value "12345-6789" into phone number field 955-3.

At T2, client 900 prompts the user with the entered phone number value "12345-6789" in field 955-3 in a modified layout format. In the example, the phone number value is presented in italics but any other change in layout format, such as a different color or an animation (e.g. blinking) is equivalent. The modified layout format indicates to the user that, for example, the phone number value "12345-6789" was entered in a wrong format and needs to be corrected (e.g. the application requires a slash instead of a dash, i.e. "12345/6789" instead of "12345-6789").

The above example is based on a client-side separation of application data (client-data) and layout information (layout document) and is based on a low-bandwidth data exchange mechanism between client 900 and server 901.

Figure 3A:
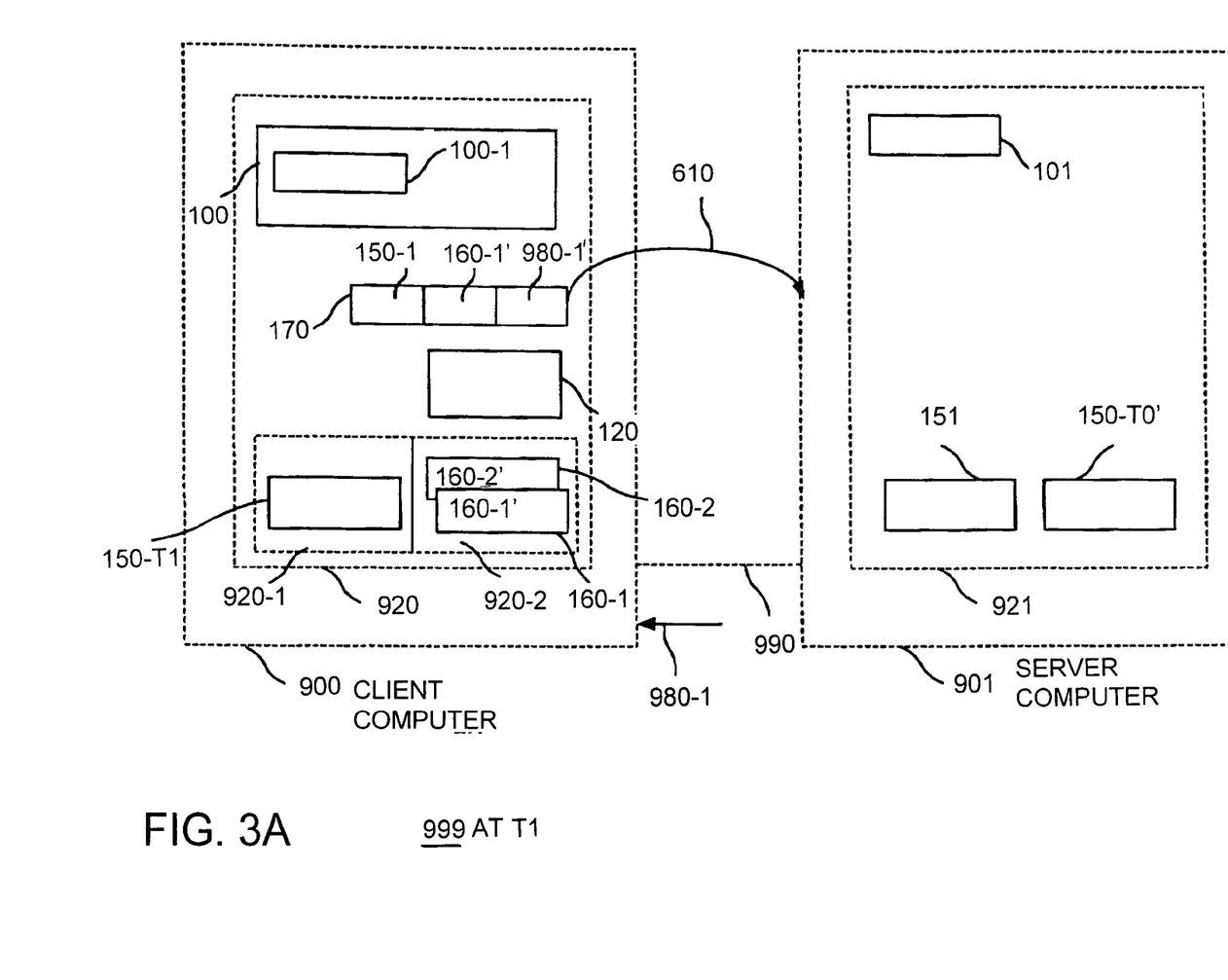
FIGS. 3A and 3B are block diagrams of the details of the computer system at two consecutive points in time.
Figure 3B:
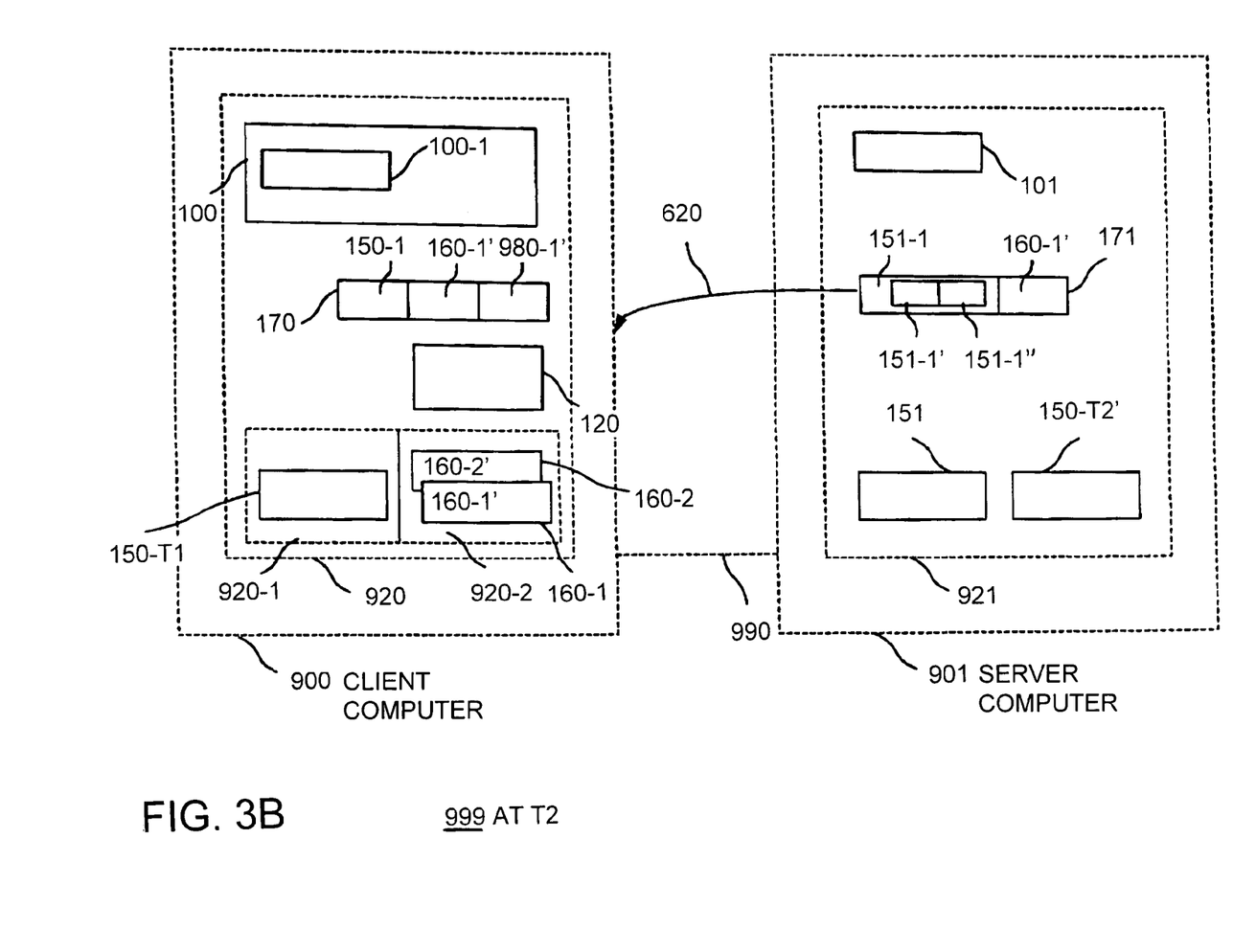

Referring to FIGS. 3A and 3B, a computer system 999 at two consecutive time points T1 and T2 is shown. Hardware components of computer system 999 are illustrated by dashed frames/lines and software components are illustrated by solid frames/lines.

Client 900 has memory 920. Memory 920 has at least client-data cache 920-1 and browser cache 920-2. Client-data cache 920-1 stores client-data 150 (application data) and browser cache 920-1 stores at least layout document 160-1, and optionally further layout document 160-2. Each layout document 160-1, 160-2 has a unique layout-ID 160-1', 160-2', respectively. Client-data cache 920-1 has a format that can be read by any browser 120 running on client 900 independent of the client's operating system (not shown). In a preferred embodiment, client-data cache 920-1 stores client-data 150 as an XML document.

Table 1 below shows an XML example of client-data 150-T0 in client-data cache 920-1 at T0 according to the example of FIG. 2. XML-tags (nodes)<...> and </...> indicate start and end of a specific storage section of client-data cache 920-1. An abbreviated notation for start and end tag is <.../>. XML (Extensible Markup Language) is a flexible way to create common information formats and share both the format and the data on the World Wide Web, intranets, and elsewhere. For example, computer makers might agree on a standard or common way to describe the information about a computer product (processor speed, memory size, and so forth) and then describe the product information format with XML. Such a standard way of describing data would enable user to send an intelligent agent (a program) to each computer maker's Web site, gather data, and then make a valid comparison. XML can be used by any individual or group of individuals or companies that wants to share information in a consistent way. XML, a formal recommendation from the World Wide Web Consortium (W3C), is similar to a language of today's Web pages, the Hypertext Markup Language (HTML). Both XML and HTML contain markup symbols to describe the contents of a page or file. HTML, however, describes the content of a Web page (mainly text and graphic images) only in terms of how it is to be displayed and interacted with. XML describes the contents in terms of what data is being described. For example, the word "phonenum" placed within markup tags could indicate that the data that followed was a phone number. This means that an XML file can be processed purely as data by a program or it can be stored with similar data on another computer or, like an HTML file, that it can be displayed. For example, depending on how the application in the receiving computer wanted to handle the phone number, it could be stored, displayed, or dialed.

Lines 1 and 8 in Table 1 indicate start and end of a storage section in client-data cache 920-1, where information about customers is stored. Lines 2 and 7 in Table 1 indicate start and end of a record for customer "1234" that corresponds to the value of entry field 955-1. Lines 3 and 6 of Table 1 indicate a section where further customer attributes are stored for said customer. Line 4 stores the customer's address "ANYWHERE" that corresponds to the value of entry field 955-2 as value attribute of the <ADDRESS /> tag.

TABLE 1

| line | XML |
|---|---|
| 1 | <CUSTOMER> |
| 2 |   <RECORD id="1234"> |
| 3 |     <PROPS> |
| 4 |       <ADDRESS value="ANYWHERE" /> |
| 5 |       ... |
| 6 |     </PROPS> |
| 7 |   </RECORD> |
| 8 | </CUSTOMER> |

The hierarchical data structure in client-data cache 920-1 allows application data storage that is free of redundancies, because the storage location of a value, such as the address value "ANYWHERE" is uniquely defined within the XML-tag hierarchy. Therefore, any layout document (e.g. 160-1, 160-2) can access the same application data (e.g. address value of entry field 955-2, FIG. 2) via a unique path (e.g. "//CUSTOMER/RECORD/PROPS/ADDRESS") that is defined, for example, by corresponding XML-tags.

Layout document 160-1 uses client-data 150. Collectively, layout document 160-1 and client-data 150 are referred to as interface document. The layout document 160-1 is separated from client-data 150, which allows a refresh of client-data 150 without refreshing layout document 160-1.

For example, initially (e.g. at T0, not shown), predefined layout document 160-1 and predefined client-data 150-T0 (not shown) are independently loaded from server 901 via network 990. Client-data 150-T0 are stored in client-data cache 920-1 and predefined layout document 160-1 is stored in browser cache 920-2. Layout document 160-1 uses client-data 150 via predefined client-functions 100-1 (e.g. JAVA-Script functions) stored in memory 920. The predefined client-functions 100-1 are part of process 100 and are not related to application coding but can be considered as an independent framework to access client-data 150.

Table 2 below shows an example of an application independent JAVA-Script function to update a value in client-data cache 920-1. Referring back to the example of FIG. 2, when the user adds the customer's phone number in entry field 955-3, line 1 of the function UpdateAttribute is called with the corresponding parameters:

strType=PROPS,
strProp=PHONE and
strValue="12345-6789".

In line 2, variable propsNode is set to an XML node of type <PROPS> (table 1). In line 3, variable propNode is set to node <PHONE> under the node <PROPS>. In line 4, the value attribute of the node <PHONE> is set to "12345-6789".

TABLE 2

| line | JAVA-Script coding |
| --- | --- |
| 1 | function UpdateAttribute(strType, strProp, strValue){ |
| 2 | var propsNode=SelectXmlNode(strType); |
| 3 | var propNode=propsNode.selectSingleNode(strProp); |
| 4 | propNode.value=strValue;} |

The UpdateAttribute function in Table 2 demonstrates the independency of any application data structure. Any application data structure is automatically mapped to the generic hierarchical data structure stored in client-data cache 920-1 (table 1).

FIG. 3A illustrates computer system 999 at T1. The user has entered value "12345-6789" into phone number field 955-3 (FIG. 2) and client 900 has added the new value of field 955-3 to predefined client-data 150-T0 resulting in predetermined client-data 150-T1.

Table 3 below shows the XML example of client-data cache 920-1 at T1 according to the example of FIG. 2. Line 5 of Table 3 stores the added phone number value "12345-6789" of customer "1234" that corresponds to the value of entry field 955-3 (FIG. 2) as value attribute.

TABLE 3

| line | XML |
| --- | --- |
| 1 | <CUSTOMER> |
| 2 |   <RECORD id="1234"> |
| 3 |     <PROPS> |
| 4 |       <ADDRESS value="ANYWHERE" /> |
| 5 |       <PHONE value="12345-6789" /> |
| 6 |     </PROPS> |
| 7 |   </RECORD> |
| 8 | </CUSTOMER> |

Client 900 receives sync-request 980-1 to synchronize client-data 150-T1 with corresponding server-data 151 of server 901. Sync-request 980-1 can be triggered by user interaction, by any server or client in network 999 or by any other application (e.g. a web service). Sync-request 980-1 is triggered when client-data 150 in client-data cache 920-1 become obsolete or incomplete. For example, when the user selects a specific field of graphical user interface 955, a corresponding function of plurality 100-1 can trigger sync-request 980-1 if the function is associated with the selected field.

Preferably, sync-request 980-1 has request type 980-1' that indicates the intention of sync-request 980-1 (e.g. back to a previous layout document; enter new data; etc.).

Upon having received sync-request 980-1, client 900 generates client-data descriptor 170. Client-data descriptor 170 is a data structure that has a browser independent format. Preferably, client-data descriptor 150-1 is a markup language document, such as an XML document. Client-data descriptor 170 includes request type 980-1' and layout-ID 160-1' of layout document 160-1, which is used by the interface document at T1 when sync-request 980-1 is received. Optionally, client-data descriptor 170 further includes the difference (client-data increment 150-1) between pre-defined client-data 150-T0 and predetermined client-data 150-T1. In the example, client-data increment 150-1 corresponds to Table 3 but excluding line 4 because the address value was not modified. If predefined client-data 150-T0 were not changed by the time when sync-request 980-1 is received, client-data increment 150-1 is empty. Low bandwidth is only needed for sending 610 client-data descriptor 170 to server 901 because only client-data increment 150-1 is included instead of predetermined client-data 150-T1 and only layout-ID 160-1' is included instead of layout document 160-1.

At T1, server 901 stores copy 150-T0' of predefined client-data 150-T0 in memory 921. Further, server 901 provides server-data 151 that are to be synchronized with predetermined client-data 150-T1. Preferably, server-data 151 are stored in memory 921 or reside on a further computer (e.g. computer 902, FIG. 1) of computer system 999.

FIG. 3B illustrates computer system 999 at T2. After server 901 has received client-data descriptor 170, server 901 adds client-data increment 150-1 to copy 150-T0' resulting in intermediate copy 150-T1' (not shown) that corresponds to predetermined client-data 150-T1.

Server 901 then generates server-data descriptor 171. Server 901 provides server-data 151 according to request type 980-1' and corresponding layout-ID 160-1' of client-data descriptor 170. For example, the server executes a corresponding application to generate or retrieve server-data 151. Server 901 determines server-data increment 151-1 that corresponds to the difference of server-data 151 and copy 150-T1'. Preferably, server-data increment 151-1 includes object data 151-1' (.e.g. phone number) and layout data 151-1" (e.g. phone number font: italic—or phone number display color: red, because phone number was entered by the user in an inappropriate format).

Dependent on the sync-request type 980-1' of client-data descriptor 170 server 901 determines an updated layout-ID (e.g. 160-1'). The updated layout-ID 160-1' equals the layout-ID 160-1' of client-data descriptor 170, if sync-request 980-1 triggers a refresh of the client-data 150-T1 used by the pre-defined layout document 160. However, the updated layout-ID is different (e.g. 160-2'), if the sync-request 980-1 triggers a refresh of client-data that require a further layout document 160-2 for display to the user. In the example of FIG. 2. updated layout-ID 160-1' still corresponds to layout document 160 that is used by client 900 at T1 because the user is prompted with the same graphical human interface 955 for phone number correction as for phone number entry.

In a further example, the user enters a value into phone number field 955-3 and further data are modified automatically by an application (e.g. the customer location depending on the country/area code of the phone number). In case the application determines to indicate the modified data to the user or in case the application determines that the phone number entry requires further entries by the user (e.g. a contact person for the phone number), server 901 sets the updated layout-ID to 160-2', because further layout document 160-2 includes corresponding further fields (not shown).

Server 901 further determines server-data increment 151-1 as the difference between intermediate copy 150-T1' and server-data 151. Server 901 updates intermediate copy 150-T1' with server-data increment 151-1 resulting in anticipated copy 150-T2' that corresponds to the anticipated state of client-data 150 at T2. Server-data increment 151-1 includes object data 151-1' and layout data 151-1".

Server 901 generates server-data descriptor 171 in a browser independent format, such as an XML document. Server-data descriptor 171 corresponds to a data structure that includes the updated layout-ID (e.g. 160-1') and server-data increment 151-1. When sending 620 server-data descriptor 171 to client 900, low bandwidth for data transmission via network 990 is required for the same reasons as explained earlier for client-data descriptor 170.

Client-data descriptor 170 and server-data descriptor 171 use the same hierarchical data structure (e.g. XML paths) as client-data 150 in client-data cache 920-1 (table 1). That is, when server 901 receives client-data descriptor 170, client-data increment 150-1 communicates to server 901 the status of data paths and values (navigation status) with respect to client-side modifications. In case request-type 980-1' leads to a server-side event that results in a new navigation status for client 900 (e.g. a new layout document using client-data), server-data increment 151-1 communicates the new navigation status to client 900. Therefore, both, server 901 and client 900 always know the navigation status of client 900.

At T2, after having received server-data descriptor 171, client 900 updates client-data 150-T1 in client-data cache 920-1 according to server-data descriptor 171 resulting in updated client-data 150-T2. Updated client-data 150-T2 include the information of server-data increment 151-1 for layout document 160-1 that is specified via the updated layout-ID 160-1' of server-data descriptor 171. In an example of Table 4 below, object data 151' are stored in the value attribute of line 5, whereas layout data 151-1" (italic font for phone number display) are stored in the style attribute.

TABLE 4

| line | XML |
|---|---|
| 1 | <CUSTOMER> |
| 2 | <RECORD id="1234"> |
| 3 | <PROPS> |
| 4 | <ADDRESS value="ANYWHERE" /> |
| 5 | <PHONE value="12345-6789" style="font:'italic'" /> |
| 6 | </PROPS> |
| 7 | </RECORD> |
| 8 | </CUSTOMER> |

In an alternative implementation, only object-data 151-1' are used to update client-data cache 920-1 but layout data 151-1" are stored intermediately in memory 920 until being processed by browser 120. An advantage of storing layout data 151-1" outside of client-data cache 920-1 is to keep the cache 920-1 small and, therefore, enable faster access to client-data 150 than in a large client-data cache that also includes layout data. For example, in the alternative implementation layout data 151-1" include a JAVA-Script function, (e.g. EInput_ctrlPhone.style="font:'italic'", wherein font is a style sheet class of Cascading Style Sheets defined in dynamic HTML) that refers to entry field 955-3 in the document object model (e.g. HTML-DOM) of layout document 160 and sets the font to 'italic'.

Client 900 compares the updated layout-ID (e.g. 160-1' in the example) of server-data descriptor 171 with layout-ID (e.g. 160-1' in the example) of client-data descriptor 170.

If there is no difference (as in the example of FIG. 2), an in-memory replacement of the document object model of layout document 160 results in a flicker-free modification of the display of graphical human interface 955. That is, the visualization of client-data 150 (e.g. phone number value "1234-56789" in layout element entry field 955-3) on output device 950 changes without any impact on the visualization of other layout elements (e.g. 955-1, 955-2) of graphical human interface 955. The user does not notice any screen flicker and, therefore, has the impression of a flicker-free exchange of the corresponding layout element (e.g. entry field 955-3).

If there is a difference (e.g. updated layout-ID equals 160-2'), client 900 loads the layout document (e.g. 160-2) that corresponds to the updated layout-ID from browser cache 920-2. In case, the corresponding layout document is not available in browser cache 920-2, client 900 loads the corresponding layout document from server 901 of from a further computer (e.g. 902) in computer system 999.

In the example of FIG. 2, object data 151-1' are empty (no application data are modified) but layout data 151-1" include layout information to display the phone number value in field 955-3 in an italics font.

Client 900 applies updated client-data 150-T2 to the corresponding layout document 160.

In a first implementation, client 900 applies updated client-data 150-T2 to layout document 160 via JAVA-Script functions, such as:

EInput_ctrlPhone.value="12345-6789";

EInput_ctrlPhone. style="font:'italic'";

by referencing the document object model of layout document 160.

In a second implementation, client 900 applies updated client-data 150-T2 to layout document 160 via a style sheet language transformation, such as XSLT. XSL Transformations (XSLT) is a standard way to describe how to transform (change) the structure of an XML (Extensible Markup Language) document in to an XML document with a different structure. XSLT is a Recommendation of the World Wide Web Consortium (W3C). XSLT can be thought of as an extension of the Extensible Stylesheet Language (XSL). XSL is a language for formatting an XML document (for example, showing how the data described in the XML document should be presented in a Web page). XSLT shows how the XML document should be recognized into another data structure (which could then be presented by following an XSL style sheet). XSLT is used to describe how to transform the source tree or data structure of an XML document into the result tree for a new XML document, which can be completely different in structure. The coding for the XSLT is also referred to as a style sheet and can be combined with an XSL style sheet or be used independently. Lines 1, 8 of Table 5 below reference entry field 955-3 (PHONE) in the document object model of layout document 160. Lines 2, 3 and 4 include XSL instructions to apply the value attribute of node <PHONE> of updated client-data 150-T2 ( table 4) to entry field 955-3. Lines 5, 6 and 7 include XSL instructions to apply the style attribute of node <PHONE> of updated client-data 150-T2 to entry field 955-3.

TABLE 5

| line | XML |
|---|---|
| 1 | <INPUT id="EInput_ctrlPhone"> |
| 2 |   <xsl:attribute name="value"> |
| 3 |     <xsl:value-of select="./PROPS/PHONE/@value" /> |
| 4 |   </xsl:attribute> |
| 5 |   <xsl:attribute name="style"> |
| 6 |     <xsl:value-of select="./PROPS/PHONE/@style" /> |
| 7 |   </xsl:attribute> |
| 8 | </INPUT> |

At T2, browser 120 running on client 900 displays graphical human interface 955 (FIG. 2) by using object data 151-1' of the updated client-data 150-T2 stored in the client-cache 920-1. Advantageously, layout data 151-1" modify the visual appearance of corresponding layout document 160 (e.g. italic font).

Figure 4:
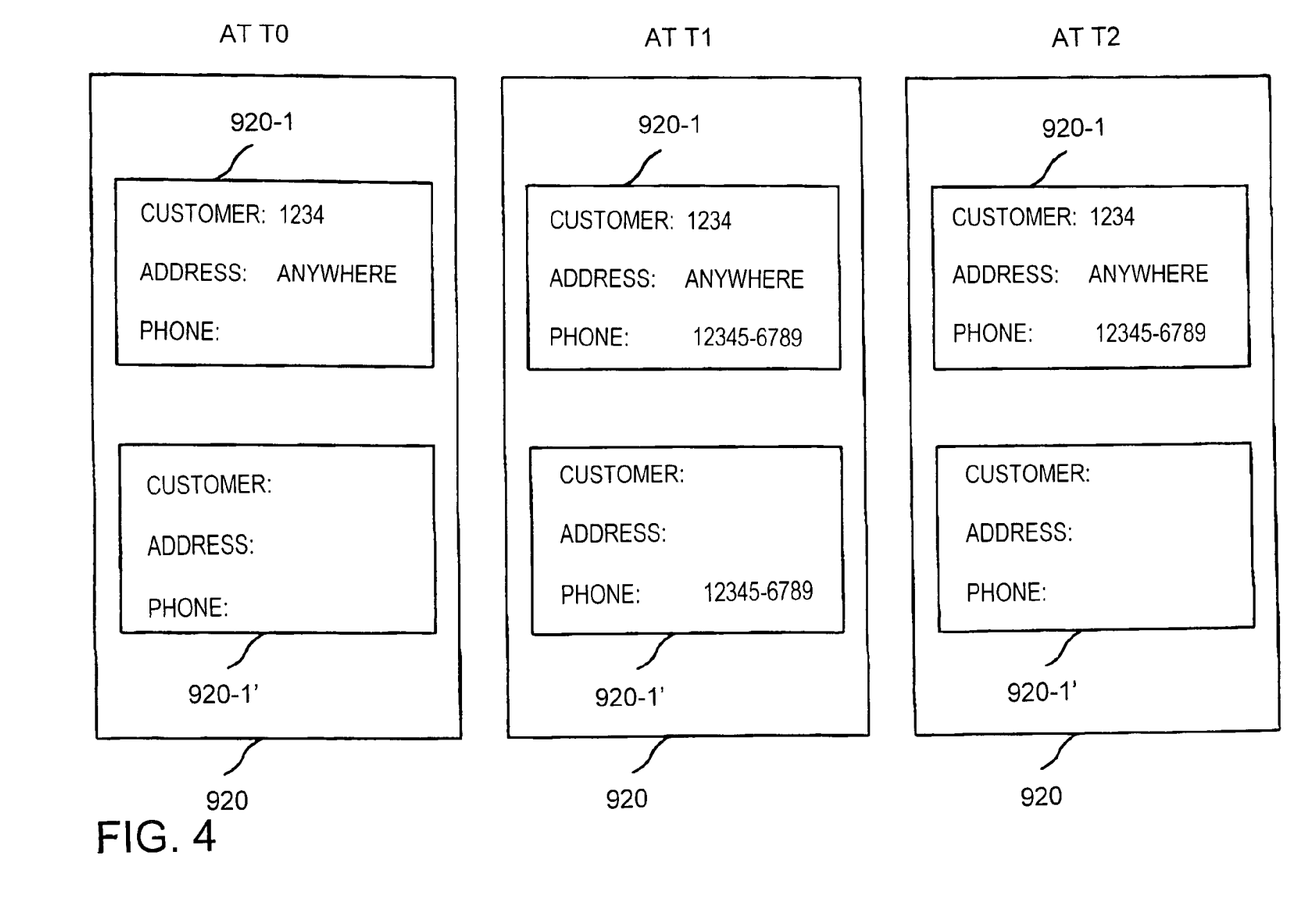
FIG. 4 is a flow diagram of a mechanism to generate client-data increments.

Referring to FIG. 4, a mechanism to generate client-data increment 150-1 is shown.

In a preferred implementation, memory 920 of client 900 further includes client-data increment buffer 920-1' having the same data structure as client-data cache 921-1. In the following description, client-data increment buffer 920-1' is referred to as buffer 921-1' and client-data cache 920-1 is referred to as cache 920-1. In the example, cache 920-1 and buffer 920-1' include storage locations to store a customer number <CUSTOMER>, a customer address <ADDRESS> and the customer's phone number <PHONE>.

Referring again to the example of FIG. 2, at T0 graphical human interface 955 prompts the user with the customer number value "1234" and the customer's address value "ANYWHERE", which are both stored as predefined client-data 150-T0 at the corresponding storage locations <CUSTOMER> and <ADDRESS> in cache 920-1. Buffer 120-1' has no values stored at T0.

At T1, after client 900 has received the phone number value "12345-6789" via user interface 960 the phone number value is stored at the corresponding storage location <PHONE> of cache 920-1. Substantially simultaneously, client 900 stores the phone number value as value attribute at the corresponding storage location <PHONE> of buffer 920-1'. Therefore, the storage content of buffer 920-1' corresponds to client-data increment 150-1 and can be attached to client-data descriptor 170. Client-data increment 150-1 is available immediately after a modification of client-data 150 (e.g. predefined client-data 150-T0) without a further need for scanning cache 920-1.

When the current layout document (160-1, FIG. 3) in the browser 120 is replaced by a further layout document (160-2, FIG. 3) while a value is stored in buffer 920-1', client 900 generates a sync-request (980-1). In this case, client 900 can automatically compose client-data descriptor 170 and send it to server 901.

Preferably, when client 900 sends 430 client-data descriptor 170 to server 901, all values are deleted from buffer 920-1'. Alternatively, the deletion can occur at any time between T1 and T2. At T2, buffer 920-1' has no values stored and is ready to trace further modifications to client-data 150-T2 (FIG. 3B).

In other examples, values that are modified in cache 920-1 can be flagged with a modification flag (not shown). When sync-request 980-1 is received, client 900 scans cache 920-1 to collect all storage locations that store values having a modification flag. Then, client 900 generates client-data increment 150-1 using the collected storage locations and the corresponding values.

Figure 5:
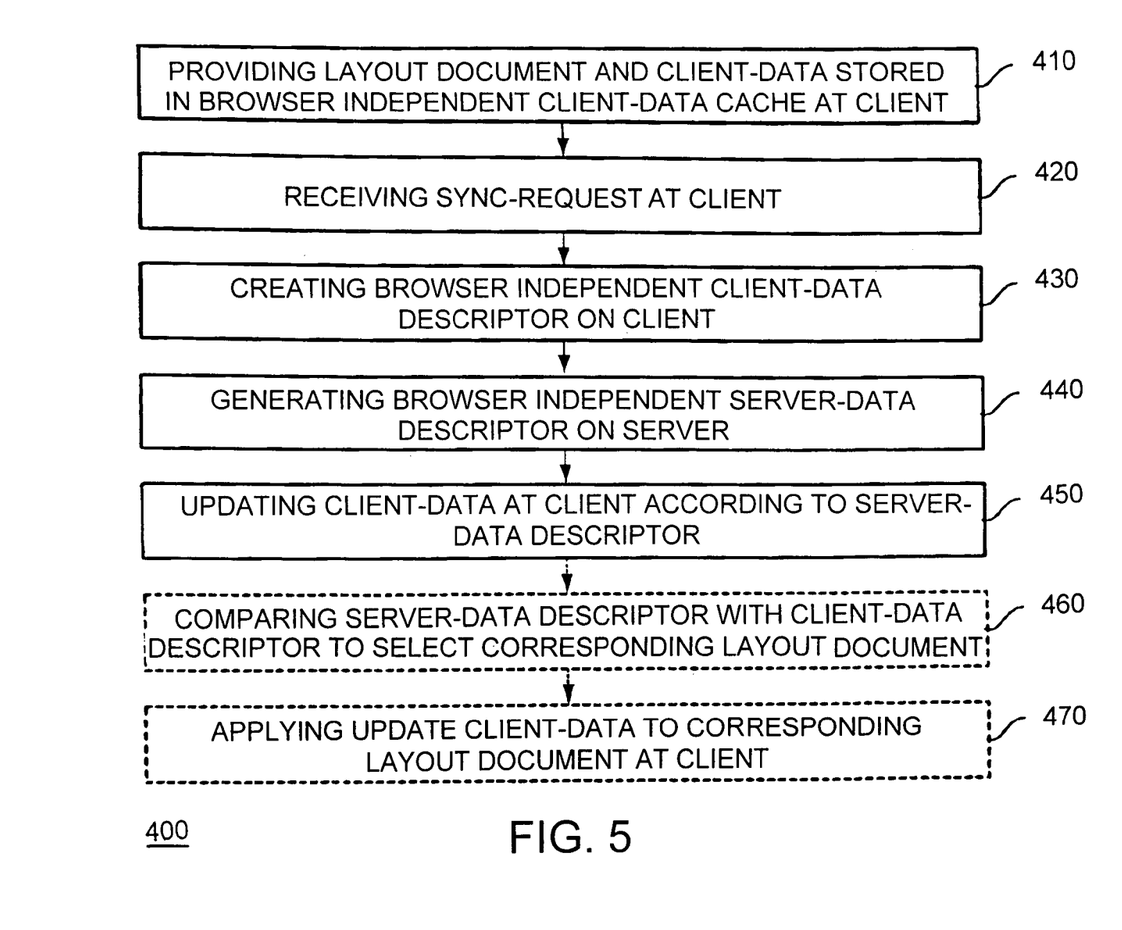
FIG. 5 is a flow diagram.

Referring to FIG. 5, a process 400 for refreshing client-data 150 used by the client-side interface document is shown. The client-side interface document is processed by browser 120, which is running on client 900.

Process 400 includes client 900 providing (410) client-side predefined layout document 160-1 and predetermined client-data 150-T1. Predetermined client-data 150-T1 are stored in client-data cache 920-1. Client-data 150-T1 are stored in a browser independent format (e.g. XML document). Layout document 160-1 is stored in browser cache 920-2 and uses predetermined client-data 150-T1 via a plurality of predefined client-side application independent functions 100-1.

Process 400 includes client 900 receiving (420) sync-request 980-1 to synchronize predetermined client-data 150-T1 with corresponding server-data 151 of server 901. Sync-request 980-1 has request type 980-1' for categorizing sync-request 980-1.

Process 400 includes client 900 creating (430) client-data descriptor 170 in a browser independent format, such as XML. Client-data descriptor 170 includes request type 980-1', layout-ID 160-1' representing layout document 160-1 and client-data increment 150-1.

Process 400 includes server 901 generating (440) server-data descriptor 171 dependent on client-data descriptor 170, server-side copy 150-T0' of predefined client-data 150-T0 and server-data 151. Server-data descriptor 171 has a browser independent format (e.g. XML document). Server 901 stores copy 150-T1' of predetermined client-data 150-T1 by combining client-data increment 150-1 with copy 150-T0' of predefined client-data 150-T0. Server-data descriptor 171 includes an updated layout-ID (e.g. 160-1', 160-2') and server-data increment 151-1. Server-data increment 151-1 includes object data 151-1' and layout data 151-1". Server 901 further creates server-side copy 150-T2' that corresponds to updated client-data 150-T2 by using server-data increment 151-1 and copy 150-T1' of predetermined client-data 150-T1.

Process 400 includes client 900 updating (450) predetermined client-data 150-T1 in client-data cache 920-1 according to server-data descriptor 171 by using server-data increment 151-1. As a result of the updating step 460, updated client-data 150-T2 are stored in client-data cache 920-1. In one implementation, updated client-data 150-T2 include object data 151-1' and layout data 151-1". In another implementation, updated client-data 150-T2 include object data 151-1' but layout data 151-1" are intermediately stored in a separate portion (not shown) of memory 920.

Process 400 may include client 900 comparing (460) server-data descriptor 171 with client-data descriptor 170 to select a corresponding layout document 160-1, 160-2. The selection is performed by using updated layout-ID (160-1', 160-2') that is included in server-data descriptor 171.

Process 400 may include client 900 applying (470) updated client-data 150-T2 to the corresponding layout document (160-1, 160-2). Advantageously, the applying (480) is performed by executing a corresponding JAVA-Script function or an XSL-Transformation (XSLT) on updated client-data 150-T2. In case, server-data increment 171 includes object-data 151-1', the corresponding, modified field values are visualized via human graphical interface 955. In case, server-data increment 171 further includes layout-data 151-1", the display of a layout element of human graphical interface 955 is adjusted, accordingly. In the example of FIG. 2, layout-data 151-1" include an instruction to change the font of the phone-number value in entry field 955-3 to italic.

The corresponding layout document (160-1, 160-2) has a document object model and in the applying (470) client 900 performs an in-memory replacement of the document object model. An advantage is a flicker-free visualization of updated client-data 151-T2 via human graphical interface 955.

Figure 6:
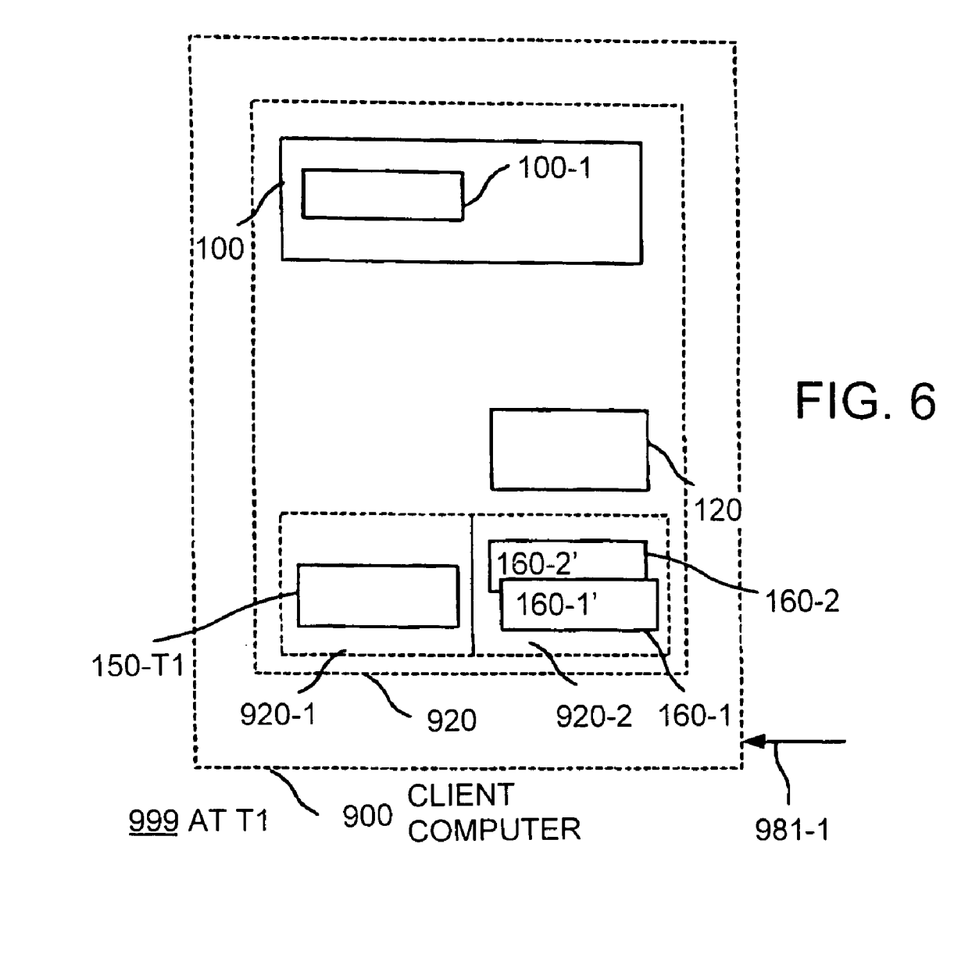
FIG. 6 is a block diagram of a computer system.

Referring to FIG. 6, computer system 999 at time point T1 is shown. In this implementation computer system 999 includes at least client 900. As described in FIG. 3, client 900 includes memory 920, which includes at least client-data cache 920-1 and browser cache 920-2. Client-data cache 920-1 stores client-data 150 and browser cache 920-2 stores at least layout document 160-1 and, optionally, further layout document 160-2.

Client-data 150 are to be refreshed when client 900 receives change-request 981-1. Change-request 981-1 can be triggered by user interaction, by any server or client in network 999 or by any other application (e.g. a web service). For example, when the user modifies the value of a specific field (e.g. 955-1 to 955-3) of graphical user interface 955, a corresponding function of plurality 100-1 can trigger change-request 981-1 if the function is associated with the selected field.

Each layout document has a corresponding layout-ID (e.g. 160-1', 160-2', respectively).

Memory 920 further stores browser 120 and process 100. Process 100 includes a plurality of predefined client-side application independent functions 100-1.

Figure 7:
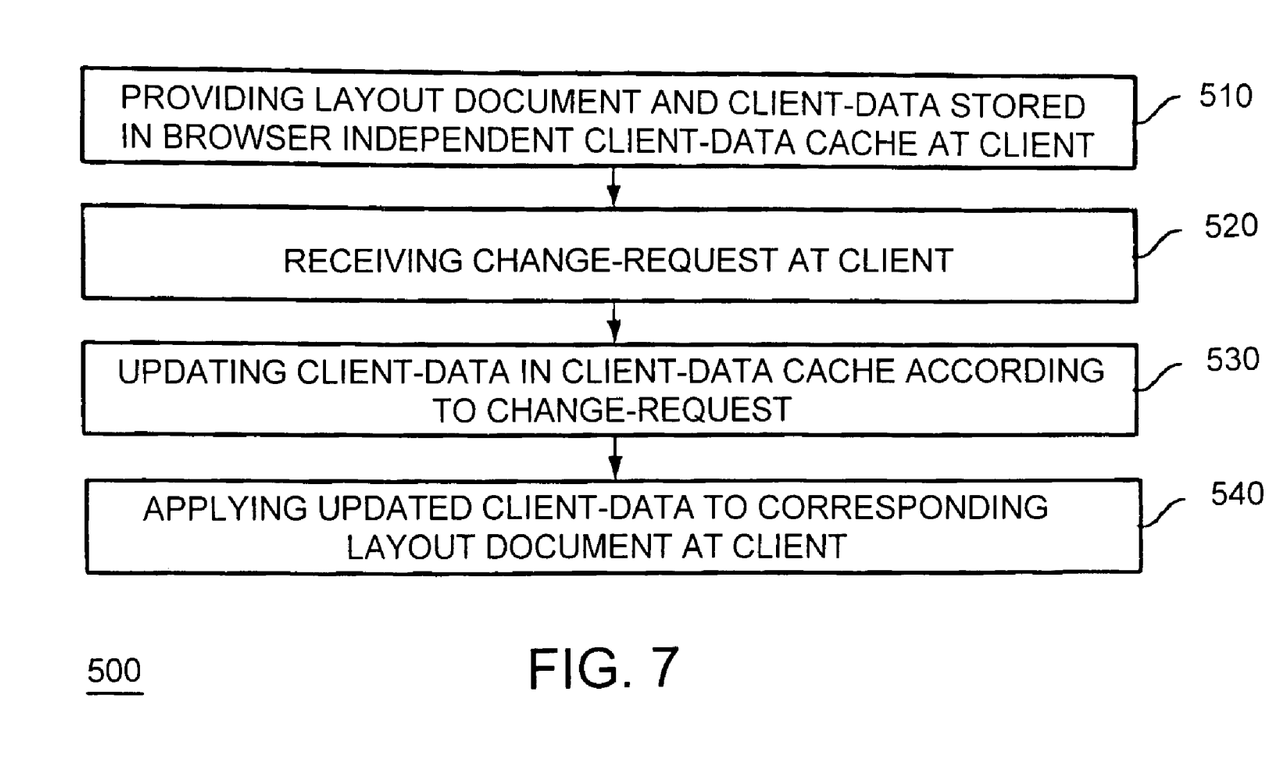
FIG. 7 is a flow chart.

Referring to FIG. 7, a process 500 describes the refresh of client-data 150 when no interaction between client 900 and server 901 is needed. Client-data 150 are used by client-side layout document (e.g. 160-1) and stored in client-data cache 920-1. The interface document is processed by browser 120 running on client 900.

Process 500 includes client 900 providing (510) predefined layout document 160-1 and predetermined client-data 150-T1. Client-data 150 are stored in client-data cache 920-1 in a browser independent format, such as XML. Layout document 160-1 uses client-data 150-T1 via a plurality of predefined client-side application independent functions 100-1 (e.g. JAVA-Script functions).

Process 500 includes client 900 receiving (520) change-request 981-1 to change predetermined client-data 150-T1 into updated client-data 150-T2 (not shown) according to change-request 981-1. For example, change-request 981-1 indicates a modification of the phone number value "1234-56789" in entry field 955-3 into value "9876-54321".

Process 500 includes performing (530) an update in case that change-request 981-1 can be processed by client 900 without synchronizing client-data cache 920-1 with a further computer (e.g. server 901). Client 900 updates 530 predetermined client-data 150-T1 in client-data cache 920-1 according to change request 981-1. For example, the phone number value "1234-56789" stored at a corresponding location in client-data cache 920-1 is changed into value "9876-54321".

Process 500 includes client 900 applying (540) updated client-data 150-T2 to layout document 160-1. Client 900 applies updated client-data 150-T2 to layout document 160-1 via a JAVA-Script function or via a style sheet language transformation (XSLT).

Layout document 160-1 has a document object model and client 900 performs an in-memory replacement of the document object model in the applying step 540. An advantage is a flicker-free visualization of updated client-data 151-T2 via human graphical interface 955.

Other embodiments are within the scope of the following claims.

What is claimed is:

1. A computer-implemented method for refreshing client-data that are visualized in a browser running on a client comprising a processor and a display, the computer-implemented method comprising:

storing at the client a first layout document and client-data, the client-data including a first field having a first value and a second field having a second value, the client-data being stored in a client-data cache in a browser independent format, the first layout document defining a first display format for displaying the client-data with a plurality of client-side application independent functions;

displaying the client-data on the display, the client-data being displayed according to the first format defined by the first layout document;

receiving at the client a sync-request to synchronize the client-data with server-data on a server, the server-data corresponding to the client-data;

creating on the client a client-data descriptor in a browser independent format, the client-data descriptor describing changes made to the client-data;

transmitting the client-data descriptor to the server;

receiving from the server a server-data descriptor in a browser independent format describing changes made to the server-data, the server-data descriptor including a second layout-ID identifying a second layout document stored at the client, the second layout document being a different layout document than the first layout document and defining a second display format for the client-data different from the first display format;

updating on the client, using the processor, the second value of the second field of the client-data in the client-data cache according to the server-data descriptor; and displaying the updated client-data in the client-data cache according to the second display format defined by the second layout document, including displaying the first value of the first field and the updated second value of the second field.

2. The computer-implemented method of claim 1 in which the client stores the first layout document in a browser cache.

3. The computer-implemented method of claim 1 in which the sync-request has a request type indicating whether the sync request is generated due to changes to the client-data or the first layout document.

4. The computer-implemented method of claim 3 in which the client-data descriptor comprises the request type.

5. The computer-implemented method of claim 4 in which the client-data descriptor further comprises a layout-ID identifying the first layout document.

6. The computer-implemented method of claim 5 in which the client-data descriptor further comprises a client-data increment describing the difference between the client-data at two points in time, before and after changes are made to the client-data.

7. The computer-implemented method of claim 6 in which the client-data descriptor is an extensible markup language (XML) document.

8. The computer-implemented method of claim 6 in which the server generates a copy of the client-data by combining the client-data increment with the copy of the client-data.

9. The computer-implemented method of claim 5 in which the server-data descriptor comprises a server-data increment describing the difference between the server-data at two points in time, before and after changes are made to the server-data.

10. The computer-implemented method of claim 9 in which the server-data increment comprises object data and layout data, the object data describing values in the server-data and the layout data describing styles in the server-data.

11. The computer-implemented method of claim 9 in which the server-data descriptor is an extensible markup language (XML) document.

12. The computer-implemented method of claim 9 in which the client uses the server-data increment to update the client-data.

13. The computer-implemented method of claim 9 in which the server creates a server-side copy that corresponds to the updated client-data by using the server-data increment and the copy of the client-data.

14. The computer-implemented method of claim 12 in which the updated client-data comprise object data and layout data, the object data describing values in the client-data and the layout data describing styles in the client-data.

15. The computer-implemented method of claim 1 in which the second layout document has a document object model and the updated client-data is applied to the second layout document by in-memory replacement of the document object model.

16. The computer-implemented method of claim 1 in which the client applies the updated client-data to the second layout document via a JAVA-Script function.

17. The computer-implemented method of claim 1 in which the client applies the updated client-data to the second layout document via a style sheet language transformation.

18. A computer program product tangibly embodied on a non-transitory computer-readable storage medium, the computer program product having a plurality of instructions for causing at least one processor of a client to:

store a first layout document and client-data, the client-data including a first field having a first value and a second field having a second value, the client-data being stored in the client-data cache in a browser independent format, the first layout document defining a first display format for displaying the client-data with a plurality of client-side application independent functions;

display the client-data on a display, the client-data being displayed according to the first format defined by the first layout document;

receive a sync-request to synchronize the client-data with server-data on a server, the server-data corresponding to the client-data;

create a client-data descriptor in a browser independent format, the client-data descriptor describing changes made to the client-data;

transmit the client-data descriptor to the server;

receive from the server a server-data descriptor in a browser independent format describing changes made to the server-data, the server-data descriptor including a second layout-ID identifying a second layout document stored at the client, the second layout document being a different layout document than the first layout document and defining a second display format for the client-data different from the first display format;

update, using the processor, the second value of the second field of the client-data in the client-data cache according to the server-data descriptor; and display the updated client-data in the client-data cache according to the second display format defined by the second layout document, including displaying the first value of the first field and the updated second value of the second field.

19. The computer program product of claim 18 in which the second layout document has a document object model and the updated client-data is applied to the second layout document by an in-memory replacement of the document object model.

20. The computer program product of claim 18 in which the client applies the updated client-data to the second layout document via a JAVA-Script function.

21. The computer program product of claim 18 in which the client applies the updated client-data to the second layout document via a style sheet language transformation.

22. A client comprising:

a processor;

a display; and program code operable to cause the processor to:

store a first layout document and client-data, the client-data including a first field having a first value and a second field having a second value, the client-data being stored in a client-data cache in a browser-independent format, the first layout document defining a first display format for displaying the client-data with a plurality of pre-defined client-side application independent functions;

display the client-data on the display, the client data being displayed according to the first format defined by the first layout document;

receive a sync-request to synchronize the client-data with server-data on a server, the server-data corresponding to the client-data;

create a client-data descriptor in a browser independent format, the client-data descriptor describing changes made to the client-data;

transmit the client-data descriptor to the server;

receive from the server a server-data descriptor in a browser independent format describing changes made to the server-data, the server-data descriptor including a second layout-ID identifying a second layout document stored at the client, the second layout document being a different layout document than the first layout document and defining a second display format for the client-data different from the first display format;

update, using the processor, the second value of the second field of the client-data in the client-data cache according to the server-data descriptor; and display the updated client-data in the client-data cache according to the second display format defined by the second layout document, including displaying the first value of the first field and the updated second value of the second field.

* * * * *